(12) United States Patent
Smoot et al.

(10) Patent No.: US 7,775,883 B2
(45) Date of Patent: Aug. 17, 2010

(54) VIDEO ACTUATED INTERACTIVE ENVIRONMENT

(75) Inventors: Lanny Starkes Smoot, Thousand Oaks, CA (US); William Joseph McArdle, Burbank, CA (US)

(73) Assignee: Disney Enterprises, Inc., Burbank, CA (US)

(*) Notice: Subject to any disclaimer, the term of this patent is extended or adjusted under 35 U.S.C. 154(b) by 1211 days.

(21) Appl. No.: 10/703,052

(22) Filed: Nov. 5, 2003

(65) Prior Publication Data

US 2004/0102247 A1 May 27, 2004

Related U.S. Application Data

(60) Provisional application No. 60/424,233, filed on Nov. 5, 2002.

(51) Int. Cl.
- *A63F 9/24* (2006.01)
- *A63F 13/00* (2006.01)
- *G06F 17/00* (2006.01)
- *G06F 19/00* (2006.01)

(52) U.S. Cl. ............... 463/36; 463/30; 463/31; 463/34

(58) Field of Classification Search .......... 463/1–5, 463/30–34, 36, 39, 49–51; 702/150
See application file for complete search history.

(56) References Cited

U.S. PATENT DOCUMENTS

| | | | | |
|---|---|---|---|---|
| 4,160,942 A * | 7/1979 | Lynch et al. | ........... | 359/443 |
| 4,751,642 A * | 6/1988 | Silva et al. | ........... | 473/152 |
| 5,025,476 A * | 6/1991 | Gould et al. | ........... | 382/115 |
| 5,319,387 A * | 6/1994 | Yoshikawa | ........... | 345/179 |
| 5,354,063 A * | 10/1994 | Curchod | ........... | 473/156 |
| 5,442,168 A * | 8/1995 | Gurner et al. | ........... | 463/36 |
| 5,495,576 A * | 2/1996 | Ritchey | ........... | 345/420 |
| 5,592,401 A * | 1/1997 | Kramer | ........... | 702/153 |
| 5,600,330 A * | 2/1997 | Blood | ........... | 342/463 |
| 5,616,078 A * | 4/1997 | Oh | ........... | 463/8 |
| 5,649,706 A * | 7/1997 | Treat et al. | ........... | 273/358 |
| 5,913,727 A * | 6/1999 | Ahdoot | ........... | 463/39 |
| 5,917,934 A * | 6/1999 | Chiu et al. | ........... | 382/149 |
| 6,028,593 A * | 2/2000 | Rosenberg et al. | ........... | 345/156 |
| 6,308,565 B1 * | 10/2001 | French et al. | ........... | 73/379.04 |

(Continued)

FOREIGN PATENT DOCUMENTS

JP        8095707        4/1996

OTHER PUBLICATIONS

PCT International Search Report dated Dec. 14, 2004.

(Continued)

*Primary Examiner*—John M Hotaling
*Assistant Examiner*—Kevin Kim
(74) *Attorney, Agent, or Firm*—Greenberg Traurig, LLP

(57) ABSTRACT

A surface-based interactive environment that utilizes low cost equipment to create a highly interactive environment for participants. The game can include electronic versions of traditional games, such as air hockey, football, soccer, and the like. The game can also include one or more electronically generated characters with whom the participants can interact. The system utilizes a high-mounted projector to create the game environment and/or generate the characters. A remotely mounted infrared light source and infrared camera are used to detect the participants as they move around within the interaction area of the game.

47 Claims, 12 Drawing Sheets

U.S. PATENT DOCUMENTS

| | | | |
|---|---|---|---|
| 6,353,428 B1* | 3/2002 | Maggioni et al. | 345/157 |
| 6,522,312 B2* | 2/2003 | Ohshima et al. | 345/8 |
| 6,628,265 B2* | 9/2003 | Hwang | 345/156 |
| 6,663,491 B2* | 12/2003 | Watabe et al. | 463/36 |
| 6,707,487 B1* | 3/2004 | Aman et al. | 348/169 |
| 6,767,282 B2* | 7/2004 | Matsuyama et al. | 463/3 |
| 6,917,301 B2* | 7/2005 | Blum et al. | 340/815.4 |
| 7,259,747 B2* | 8/2007 | Bell | 345/156 |
| 2001/0012001 A1* | 8/2001 | Rekimoto et al. | 345/173 |
| 2001/0022861 A1 | 9/2001 | Hiramatsu | |
| 2001/0043720 A1 | 11/2001 | Hayashi | |

OTHER PUBLICATIONS

N. Matsushita, et al. "HoloWall: A New Construction Method of a Wall-type Interface," *Computer Software*, vol. 15, No. 6, Japan Society for Software Science and Technology, Nov. 16, 2998, pp. 45-51. (JP Examiner's explanation only).

T. Ooshima et al. "AR2 Hockey System: A Collaborative Mixed Reality System," *The Virtual Reality Society of Japan*, Jun. 30, 1998, vol. 3, No. 2, pp. 55-60. (abstract and JP Examiner's explanation only).

Office Action dated Apr. 8, 2008 from corresponding Japanese Patent Application No. 550,522/2004. (English translation).

Sparacino, F.; Davenport, G.; and Pentland, A. "Media in performance: Interactive spaces for dance, theater, circus, and museum exhibits." IBM Systems Journal, vol. 39, Nos. 3&4, 2000.

Väätänen, Antti; Strömberg, Hanna; and Räty, Veli-Pekka. "Nautilus: A Game played in Interactive Virtual Space." VTT Information Technology, Tampere, Finland.

Väätänen, Antti; Strömberg, Hanna; and Räty, Veli-Pekka. "A Group Game Played in Interactive Virtual Space—Design and Evaluation." VTT Information Technology, Tampere, Finland.

Vergano, Dan. "Museum's fantastic voyage through the body." USATODAY.com, Aug. 13, 2001.

Supplemental European Search Report, dated Nov. 22, 2005, from related European App. No. 03768712.6.

* cited by examiner

VIDEO ACTUATED INTERACTIVE ENVIRONMENT

RELATED APPLICATIONS

This application claims prior from Provisional U.S. Patent Application Ser. No. 60/424,233, filed Nov. 5, 2002, which is hereby incorporated by reference in its entirety.

BACKGROUND OF THE INVENTION

1. Field of the Invention

The present invention relates to the field of interactive gaming, and more particularly provides a system and methods for creating an interactive environment which is projected upon various surfaces.

2. General Background and State of the Art

Locations that draw a large number of guests, such as shopping malls, theme parks, museums, movie theaters, and the like, frequently encounter problems guiding visitors to a desired location, such as a favorite store, favorite ride, new exhibit, or desired film. Some in the prior art have attempted to remedy this problem by providing interactive, touch-screen based information kiosks capable of displaying maps and other information for guests. Unfortunately, these kiosks have met with only limited success because the time required to interact with them to find a desired location is frequently significantly longer than that required to request the information from a human attendant.

Another problem facing locations that draw a large number of guests is keeping them entertained as they move from desired location to desired location or as the guests await access to an attraction. This problem is especially poignant in theme parks, movie theaters, and restaurants, where visitors may be required to wait a significant length of time before they can ride a given ride, obtain a ticket for or view a movie, or be seated for their meal.

Still another problem facing locations that draw a large number of guests is providing new and exciting attractions that make the visitors want to return. In "Media in performance: Interactive spaces for dance, theater, circus, and museum exhibits", which appeared in Volume 39, Nos. 3 & 4 of the *IBM Systems Journal* (2000), the teachings of which are incorporated herein by reference in their entirety, F. Sparacino, G. Davenport, and A. Pentland describe complex visual and tactile sensor based computer systems which permit individual museum visitors to interact with and view a large number of exhibits in a limited exhibition space. The Sparacino system can also monitor movement of an individual performer, thereby permitting the performer to access computer-controlled music, projected text, or the like based on simple behaviors.

While some, such as Sparacino, have developed systems that function well in controlled environments, these systems have several limitations that hamper their wide-spread use. By way of example, the equipment required by such systems is typically very large, requiring significant physical space, and the equipment is frequently expensive, high-end computer equipment, such as Silicon Graphics® workstations or the like. Furthermore, current systems are typically suitable for only specific environments. For example, Sparacino et al. indicate that their video sensor based interactive virtual environment can only be used where the background does not move, and that their environment supports monitoring of only a single individual. This limits the Sparacino approach to a very narrow set of potential uses, such as individual performers on a stage, rather than allowing for its use in real-world environments. Other systems, such as the Nautilus game developed by VTT Information Technology and the Vital Space exhibit at the Smithsonian Institution's National Museum of Natural History, require touch-sensitive tables, floor mats, or the like, which also limit the environments in which such systems can be used.

SUMMARY OF THE INVENTION

Accordingly, the present invention is directed to a system and methods for creating a video actuated, interactive environment that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

The present invention provides a platform upon which a number of interactive guest entertainment, educational, and/or informational applications can be constructed. By way of example, without intending to limit the present invention, in an outdoor setting, guests ambling along a somewhat darkened outdoor walkway, or waiting in line for an attraction at a theme park, movie theater, museum, or the like, can play an interactive football, soccer, air-hockey, or other such game just by kicking back and forth or otherwise interacting with a "virtual" ball, puck, or the like projected on the ground, cement, pavement, or other such surface.

One embodiment of the present invention uses an overhead video projection and detection means to create a floor-based, interactive area. The overhead video projection and detection means is preferably tied to a computer processing means which can resolve the presence of human participants on the interactive area, and which can assign projected icons, ranging from static images to full motion, three dimensional video, to one or more participants. The overhead video projection means is also preferably capable of causing other icons to be projected anywhere in the interactive area.

Although the embodiments described herein focus on systems wherein the the interactive area is the floor, it should be apparent to one skilled in the art that the invention can be readily adapted such that the interactive area is any surface, including, but not limited to, walls, a ceiling, furniture surfaces, or the like. Therefore, as used herein, terms such as "overhead", "above", "below", and the like should not be construed as absolute position references, but rather as indicating a position relative to the surface being used as the interactive area.

The present invention preferably employs a low cost video-based detection system to provide a large-scale, interactive guest experience. In operation, one or more low cost infrared video cameras can observe a surface, thereby creating an interaction area. An infrared video camera is preferred as infrared scene illumination makes it possible to track guests imperceptibly, even in areas where little if any visible light is available. The video signal from the infrared video camera is preferably routed to a low cost, personal-computer-based video processing system for processing.

To improve system performance, guests may be issued one or more wearable retro-reflective targets, such as dog tag like identification tags, wristbands, pins, buttons, or the like, or transportable props to which one or more retro-reflective targets have been attached, such as magic wands, batons, or the like. Where a plurality of retro-reflective targets are assigned to a prop, person, or the like, it becomes possible to determine the orientation of the target or object, and thus the system can provide an even more compelling experience to the guest. In such an embodiment, a set of three targets, preferably creating a non-equilateral triangle, can be used to facilitate easy orientation identification. Such props may also contain Radio Frequency Identification (RFID) tags, bar codes, or other identifiers to facilitate positive identification of individual guests.

Where a plurality of targets are used, and the distance between the targets is known, it is also possible to determine the distance of the targets from the camera. This can be advantageous in situations wherein interactions in an interactive environment depend in part on the position of the surface to which the targets are attached relative to the interaction area. By way of example, without intending to limit the present invention, in a hockey-style game, if players are issued a hockey stick with a target near the tip of the blade and another target near the handle end of the blade, the distance between the targets can be monitored by the present invention. As the stick moves closer to the camera, i.e. as it is raised from the floor, the distance between the targets appears to increase from the camera's perspective. Thus, as the game is played, if the invention detects that the hockey stick is raised above the interaction surface by a given height, the puck may appear to pass under the blade of the hockey stick.

Even where the distance between targets is not known, using a plurality of targets can enable scaling of projected images to meet a desired aspect ratio relative to the targets. By way of example, without intending to limit the present invention, plurality of circular discs may be suspended from a moving sheet of plywood near the ceiling of a darkened room, with targets mounted at the center of each disc and a target mounted at a point on the outer edge of each disc. Such an arrangement can allow the present invention to determine the center of each disc and each disk's edge, especially where the position of the edge tag is known relative to the center tag (e.g. the edge tag is always above the center tag). Based on the distance between the targets, the invention can calculate the scale of an icon to be projected onto the disc by the visible light projector such that the icon takes maximum advantage of the disc without bleeding into the background. The position of the disc can also be monitored, and the icon projected onto the disc can be precisely located such that the projected icon appears to move with the disc. Effects which are especially visually impressive can then be created where the projected icon is a dynamic image, such as, but not limited to, an eyeball opening and closing.

Retro-reflective targets can also simplify and enhance the detection of the guest as he or she enters the interaction area, and to isolate a particular portion of the guest or a prop he or she carries for interactivity. By way of example, without intending to limit the present invention, a target can be applied to the toe area of guests' shoes, thereby making it especially clear when a shoe tip has "collided" with a computer generated or computer controlled object such as a football. Targets of varying size can also be used on a single prop or participant to readily differentiate between different parts of the prop or participant.

By using a plurality of such targets, "hot-spots" can be created on a person or a prop, and these hot-spots can be easily tracked. Computer generated or computer controlled markers can be assigned to one or more hot-spots and projected thereon, so as to allow an participant to have precise knowledge and feedback on the currently perceived position of their hot-spots.

One embodiment of the present invention can be used to immerse players in an interactive game of virtual "air hockey". Players in such an embodiment can wear a target on each shoe, thereby effectively becoming a virtual paddle. The goals and table boundaries can be projected on the ground, or can be physically demarcated on the ground. The players can move around within the table boundaries, and can "kick" the image of a hockey puck which is projected onto the ground. The personal computer system preferably tracks the projected location of the hockey puck and the players' feet, the speed with which the players' feet are moving, and the like, and moves the hockey puck as though it were on an air hockey table.

In another embodiment, animated characters can be made aware of guest positions, thereby permitting the characters to interact with guests, speak to them, and direct them in desirable directions. For instance, a projected cartoon character could lead a walking guest to a favorite ride, a specific store or other such venue. The characters can be made to interact with guests in a variety of ways, including, but not limited to, stopping when a guest stops and heading the guest off if he/she is not moving in a desired direction. Audio cues can also be tied to the characters to make it appear that the cartoon character is actually talking to the guest. It should be apparent to one skilled in the art that although animated characters are described herein, alternative character types, including pre-recorded or live human actors, can be substituted therefor without departing from the spirit or the scope of the invention. A preferred physical apparatus required to achieve the large-scale game is compact and low-cost, and can even be set up in a portable manner for movement from venue to venue. Furthermore, a master computer system can be implemented to tie individual systems together, thereby allowing guests to roam a large space while still having access to a single character, and for higher resolution projections within each system.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of at least one embodiment of the invention.

In the drawings.

DETAILED DESCRIPTION OF THE INVENTION

Reference will now be made in detail to the preferred embodiments of the present invention, examples of which are illustrated in the accompanying drawings.

Figure 1:
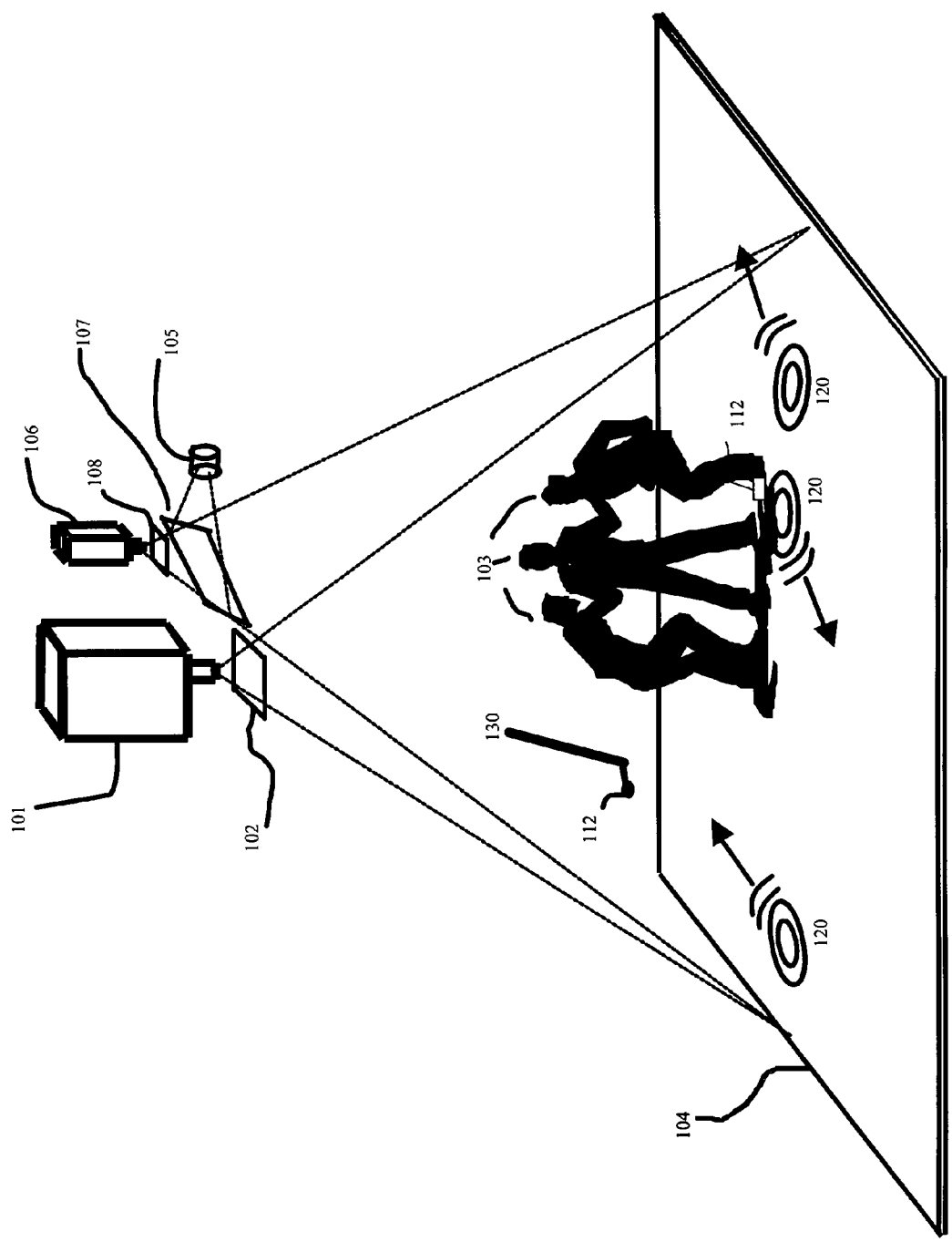
FIG. 1 depicts an interactive surface according to an embodiment of the invention.

FIG. 1 illustrates the use of the present invention to create an interactive area 104 on the floor. In the embodiment illustrated in FIG. 1, the interactive area is preferably viewed from above by infrared (IR) video camera 106, and is preferably lit by one or more IR illuminators 105 or other electromagnetic energy source capable of generating electromagnetic energy with a relatively limited wavelength range. The effect of IR illuminators may be enhanced via one or more beam splitters 107. Imagery is preferably projected upon interactive area 104 by visible light projector 101. Video image objects 120, projected by one or more projectors 101, can be made to react to the detected position of persons or physical objects 103 within interactive area 104.

IR illuminators 105 preferably employ multiple infrared LEDs to provide a bright, even field of infrared illumination over interactive area 104. An illuminator such as, but not limited to, the IRL585A from Rainbow CCTV is suitable for this application.

IR Camera 106 may be a typical black and white CCD video surveillance camera with any internal infrared blocking filter removed or other video camera capable of detection of electromagnetic energy in the infrared wavelengths. Numerous low-cost, surveillance type cameras are readily available, and can easily be adapted to this application.

IR blocking filter 102 is preferably placed in projector 101's optical path to prevent residual IR light from projector 101 from polluting the interactive area. Similarly, IR blocking filters may be employed in lamps, streetlights, and other such illumination means positioned near interactive area 104.

IR pass filter 108 is preferably inserted into the optical path of camera 106 optical path to insure that camera 106 is maximally sensitive to the wavelengths emitted by IR illuminator 105, and effectively insensitive to other wavelengths. In this manner, the overall system is made insensitive to known sources of potentially interfering light near interactive area 104.

Although other means of detection are possible, the use of infrared light is preferred since human eyes are insensitive to this illumination and it will not interfere with visible light being projected on interactive area 104 by projector 101 or alter the mood in a low-light environment.

In one embodiment, participants can be outfitted with retro-reflective patches 112 which are configured to generally face camera 106, and preferably in a location that will not typically be blocked by the participant's body. By way of example, without intending to limit the present invention, a 0.25"×0.25" reflector may be pinned to the back collar of a participant's shirt, taped to a participant's shoulders or shoes, or the like. Parts of the participant's body with one or more retro-reflectors will appear extremely bright in the visual field of camera 106 as compared to other objects within the camera's field of view since the retro-reflector will return illuminator 105's light substantially back to the position of illuminator 105 (and via transmission through beam-splitter 107 to camera 106).

Participants may also use props, such as the hockey stick-shaped retro-reflector target holder 130 illustrated in FIG. 1. In such an embodiment, one or more objects displayed by projector 101 can be made to appear physically attached to the end of prop 112 where the retro-reflector target is mounted. Moreover, the prop extends the retro-reflector away from the participant's body so that it is less likely that camera 106's view of the retro-reflector will be blocked by any of the participants.

In still another embodiment, participants and/or props may be equipped with infrared emitters, such as, but not limited to, conventional flashlights to which an IR pass filter has been attached, infrared light emitting diode (LED), or other single point source of preferably diffuse infrared energy. Such emitters may be used in lieu of, or in addition to, targets.

Figure 2:
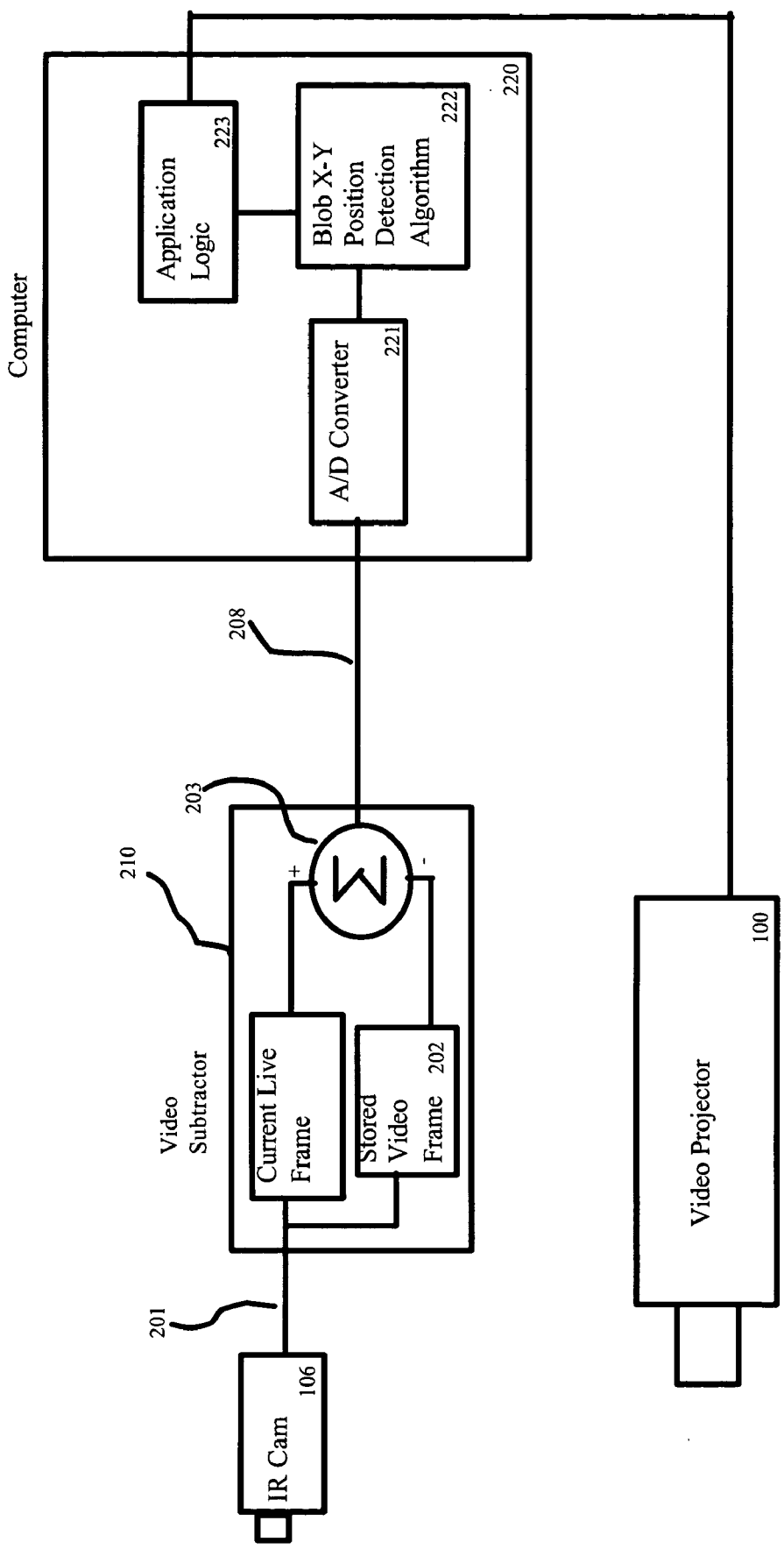
FIG. 2 depicts a video processing and computer control system according to an embodiment of the invention.

In the embodiment illustrated in FIG. 2, video image data from camera 106 is pre-processed by circuit 210. As FIG. 2 illustrates, circuit 210 preferably compares incoming video 201 from camera 106, a frame at a time, against a stored video frame 202 captured by camera 106. Stored video frame 202 is preferably captured when interactive area 104 is devoid of players or other objects. However, it should be apparent to those skilled in the art that stored video frame 202 may be periodically refreshed to account for changes in the interactive environment.

Difference video signal 208 is preferably generated by video subtractor 203 by subtracting stored video frame 202 from the current frame. This difference video signal will display only players and other objects that have entered or moved within interactive area 104 from the time stored video frame 202 was captured. Difference video signal 208 is preferably applied to a PC-mounted video digitizer 221. Suitable digitizing units include, but are not limited to, the PC-Vision video frame grabber from Coreco Imaging.

Although video subtractor 210 can simplify the removal of artifacts within the field of view of camera 106, such as retro-reflective targets that have fallen off of participants and which are still in the interaction area, a video subtractor is not always necessary. By way of example, without intending to limit the present invention, the location of targets can be monitored over time, and the system may ignore targets which do not move after a given period of time until they are in motion again. The system may also alert a person in control of the system if a target stops moving for a given period of time, as this may indicate an injured participant, or other problems within the interactive area. In an alternative embodiment, frame-by-frame target detection can be accomplished independently from other frames.

Blob detection algorithm 222 operates on the image to calculate the X and Y position of the center of each bright object, or "blob", in the image. Blob detection algorithm 222 may also calculate the size of each blob. Blob detection algorithm 222 is preferably implemented using user-selectable parameters, including, but not limited to, low and high pixel brightness thresholds, low and high blob size thresholds, and search granularity. Once size and position of any blobs in a given video frame are determined, this information is passed to applications software 223 to determine how to interact with persons in interaction area 104. By way of example, without intending to limit the present invention, applications software 223 can generate a video output, which is then projected onto interaction area 104.

Figure 3:
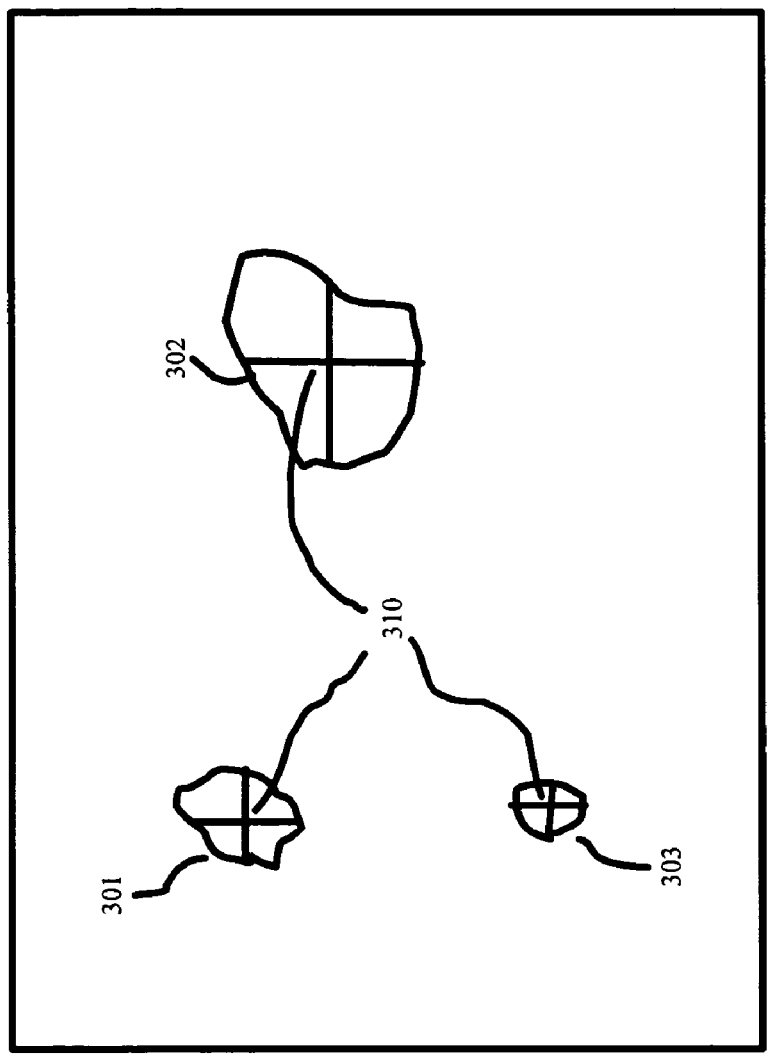
FIG. 3 depicts a video blob location algorithm according to an embodiment of the invention.

FIG. 3 depicts a pre-processed video image 208 as it is presented to blob detection algorithm 222. As described above, blob detection algorithm 222 may detect individual bright spots 301, 302, 303 in difference signal 208, and the X-Y position of the centers 310 of these "blobs" is determined. In an alternative embodiment, the blobs may be identified directly from the feed from IR camera 106. Blob detection is preferably accomplished for each group of contiguous bright pixels in each individual frame of incoming video, although it should be apparent to one skilled in the art that the frame rate may be varied, or that some frames may be dropped, without departing from the spirits or the scope of the invention.

As described above, blobs are preferably detected using adjustable pixel brightness thresholds. Each frame is preferably scanned beginning with an originating pixel. Each pixel is first evaluated to identify those pixels of interest, i.e. those that fall within the lower and upper brightness thresholds. If a pixel under examination has a brightness level below the lower brightness threshold or above the upper brightness threshold, that pixel's brightness value is set to zero (i.e. black). Although both upper and lower brightness values may be used for threshold purposes, it should be apparent to one skilled in the art that a single threshold value may also be used for comparison purposes, with the brightness value of all pixels whose brightness values are below the threshold value being reset to zero.

Once the pixels of interest have been identified, and the remaining pixels zeroed out, the blob detection algorithm begins scanning the frame for blobs. The scanning process begins with an originating pixel. If that pixel's brightness value is zero, a subsequent pixel in the same row is examined. The distance between the current and subsequent pixel is determined by a user-adjustable granularity setting. Lower granularity allows for detection of smaller blobs, while higher granularity permits faster processing. When the end of a given row is reached, examination proceeds with a subsequent row, with the distance between the rows also configured by the user-adjustable granularity setting.

If a pixel being examined has a non-zero brightness value, blob processing software 222 begins moving up the frame-one row at a time in that same column until the top edge of the blob is found (i.e. until a zero brightness value pixel is encountered). The coordinates of the top edge are saved for future reference. The blob processing software 222 then returns to the pixel under examination and moves down the row until the bottom edge of the blob is found, and the coordinates of the bottom edge are also saved for reference. The length of the line between the top and bottom blob edges is calculated, and the mid-point of that line is determined. The mid-point of the line connecting the detected top and bottom blob edges then becomes the pixel under examination, and blob processing software 222 finds the left and right edges through a process similar to that used to determine the top and bottom edge. The mid-point of the line connecting the left and right blob edges is then determined, and this mid-point becomes the pixel under examination. The top and bottom blob edges may then be calculated again based on the location of the new pixel under examination. Once the approximate blob boundaries have been determined, this information is stored for later use. All pixels within the bounding box described by the top, bottom, left, and right edges are then assigned a brightness value of zero, and blob processing software 222 begins again, with the original pixel under examination as the origin.

Although this detection algorithm works well for quickly identifying contiguous bright regions of uniform shape within the frame, the detection algorithm may result in the detection of several blobs where only one blob actually exists. To remedy this, the blob coordinates are compared, and any blobs that intersect or touch are combined together into a single blob whose dimensions are the bounding box surrounding the individual blobs. The center of each combined blob is also computed based on the intersection of lines extending from each corner to the diagonally opposite corner. Through this processes, a detected blob list, which preferably includes, but is not limited to including, the center of each blob; coordinates representing the blob's edges; a radius, calculated as the mean of the distances from the center of each of the edges; and the weight of each blob, calculated as a percentage of pixels within the bounding rectangle which have a non-zero value, can be readily determined.

Thresholds may also preferably be set for the smallest and largest group of contiguous pixels to be identified as blobs by blob processing software 222. By way of example, without intending to limit the present invention, where a uniform target size is used and the size of the interaction area and the height of the camera above the interaction area are known, a range of valid target sizes can be determined, and any blobs falling outside the valid target size range can be ignored by blob processing software 222. This allows blob processing software 222 to ignore extraneous noise within the interaction area and, when targets are used, to differentiate between actual targets in the interaction area and other reflections, such as, but not limited to, those from any extraneous, unavoidable, interfering light or from reflective strips worn as part of a guest's conventional clothing, as has become common on some athletic shoes. Blobs detected by blob processing software 222 that fall outside the threshold boundaries set by the user are preferably dropped from the detected blob list.

Although a preferred embodiment of computer 220 of FIG. 2 includes both blob processing software 222 and application logic 223, blob processing software 222 and application logic 223 are preferably constructed from a modular code base. This allows blob processing algorithm 222 to operate on one computer, with the results therefrom relayed to application logic 223 running on one or more other computers. By way of example, without intending to limit the present invention, such results may be transmitted to the other computers using 802.11 (g) compliant wireless networking interfaces to facilitate system portability. In the event the computing capabilities of a given computer are not sufficient to track multiple blobs, this modular architecture can allow a plurality of targets to be easily tracked across the interactive surface.

By knowing the position of targets within the interaction area, application logic 223 can detect collisions between one or more targets and computer-generated video objects (for instance a video-projected puck, or ball) or other projected images, such as those that are locked to the physical position of participants (or their props) in the interactive space. Additionally, MIDI triggers can be used to generate sounds upon the collision of blobs, video objects, or combinations thereof, with each other, the interactive area border, or other aspects of the interactive area.

Figure 4:
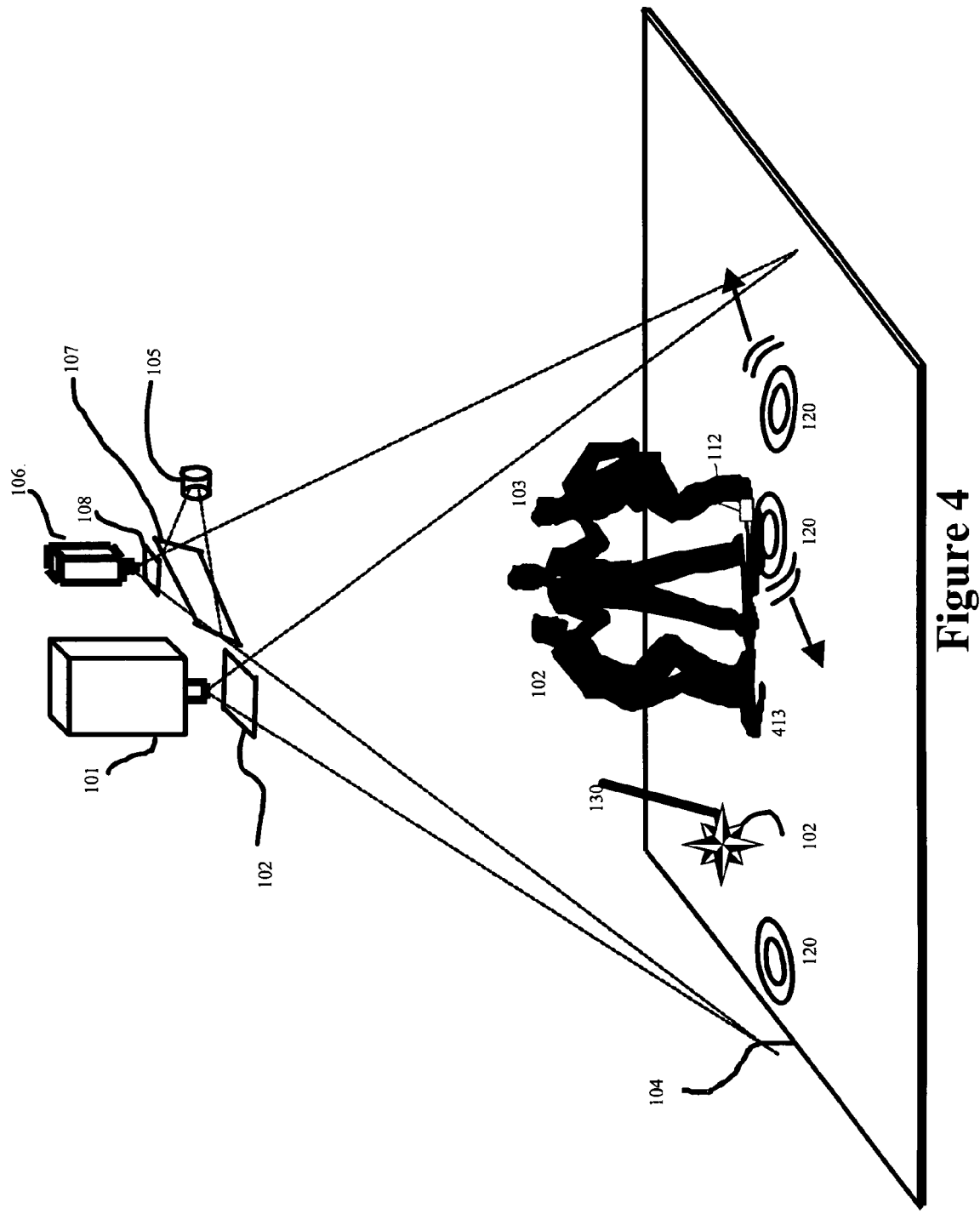
FIG. 4 depicts a floor-based puck-kicking game and interactive hockey stick according to an embodiment of the invention.

In the embodiment illustrated in FIG. 4, guests can utilize a floor-based interactive area provided by the present invention to play an electronic version of "Air Hockey". Here, guests are able to kick a projected puck 120 back and forth, preferably after having applied retro-reflector 112 to the toes of their shoes. In this case, the positions of the guests' feet are determined by blob processing software 222, and a graphical image of a special ball hitting "appendage", such as, but not limited to, a "pronged foot scoop", can be projected surrounding the target on each guest's foot. For example, pronged scooper 413 can be projected onto the floor to allow players to see the zone within which contact with projected puck 120 will be achieved.

Alternatively, players can use a prop, such as hockey stick like device 130 of FIG. 4, to push the "puck" around. Where a prop is used, the prop may have one or more retro-reflector targets mounted to it. In such an embodiment, a graphical image may be projected around the prop, in a manner similar to that described above for the guest's shoe. The projected graphical image can have a visible and/or invisible border, such as may be determined by measuring a circle of a given radius emanating from the center of the blob associated with the guest's foot. Such a border can be used to determine when "contact" has been made with another game object, such as the projected puck.

The video images of the puck or ball can be photographic, for instance a digitized photo of an actual air hockey puck, or fanciful, stylized, images. On-floor goals can be set up that react to the entrance of the puck, and the physics of actual puck movement can be programmed into all of the game actions. If the participants are using a prop to interact with the system, such as the hockey stick described in the previous embodiment, versions of "Pong", hockey, soccer, table tennis, or other game can easily be implemented and played. Depending on the direction that the puck is hit, it can be imparted with a video movement that simulates that which would have occurred had the player actually hit a real life object.

Figure 5:
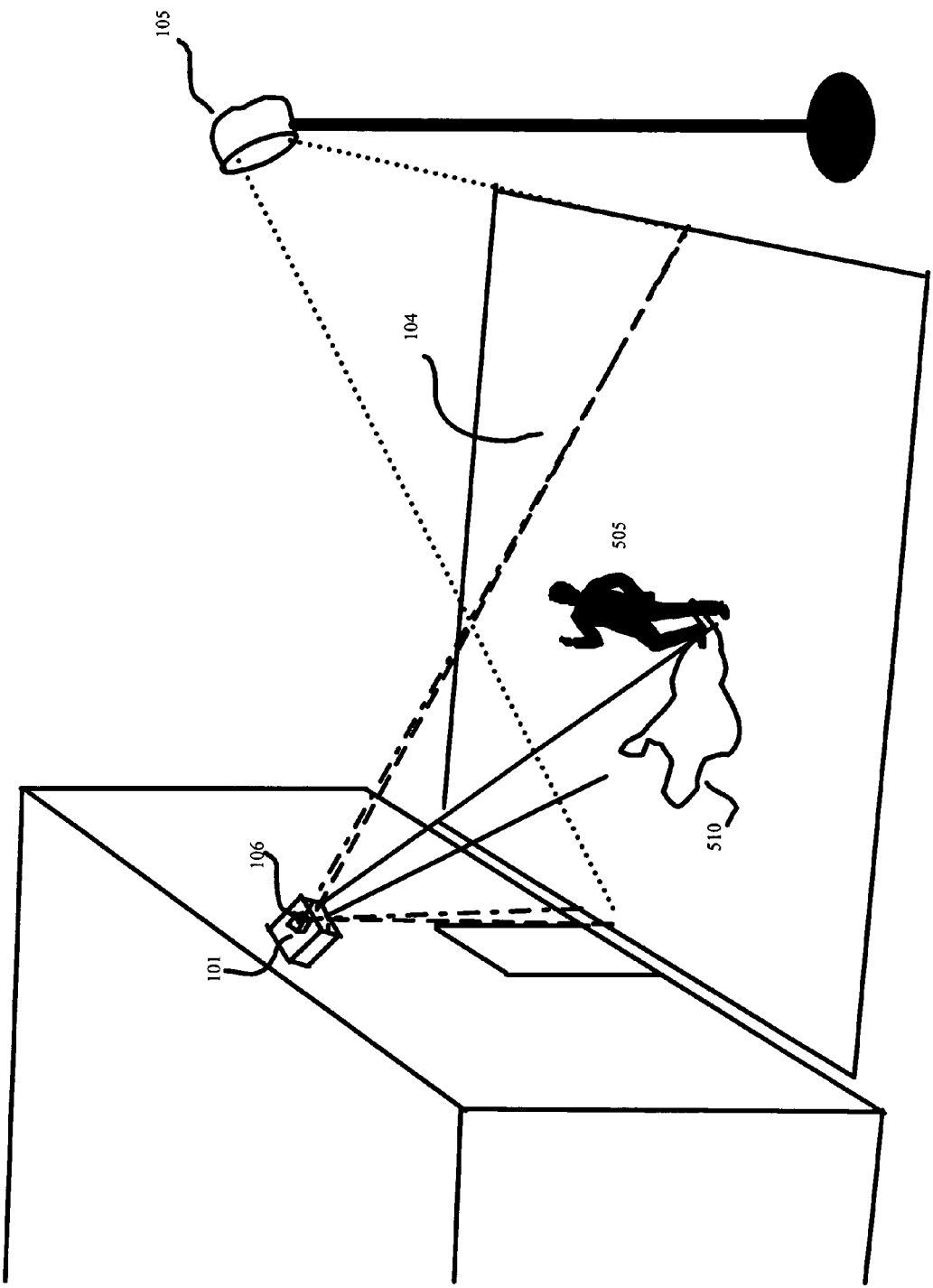
FIG. 5 depicts an embodiment of our invention wherein white shadows are projected.

In the alternative embodiment illustrated in FIG. 5, IR light source 105 provides illumination to camera 106, which has a view of interaction area 104. In this embodiment, IR light source 105 is preferably located substantially remotely from the camera 106 and projector 101. The position of IR light source 105 causes the guest to cast a shadow (in the infrared) 510 within interaction area 104. This shadow can be imaged by camera 106, and a novel and compelling illusion can be constructed. The processing system for this embodiment is shown in FIG. 6.

Figure 6:
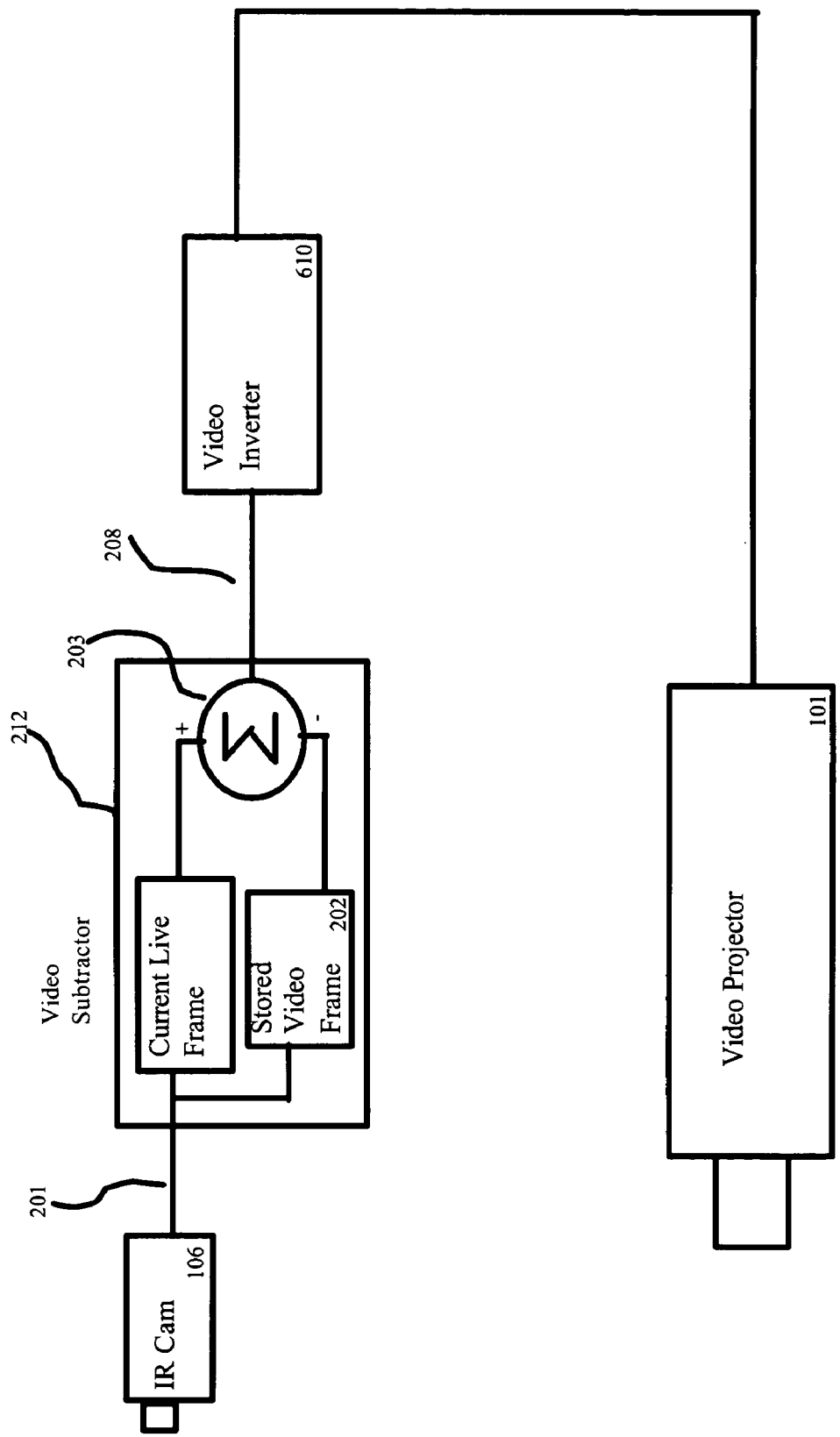
FIG. 6 depicts image processing according to an aspect of the white shadows embodiment of our invention.

As illustrated in FIG. 6, the subtractive preprocessing described with respect to the embodiment of FIGS. 1-3 may optionally be used in this embodiment to remove any effects created by extraneous objects or light in the interactive area, thereby allowing the system to detect and facilitate interaction with the participant(s) 505. If subtractive preprocessing is used, the difference video image is then applied to video inverter 610, and the output can be fed to projector 101. If subtractive preprocessing is not used, the output from camera 106 can be fed directly to video inverter 610.

By inverting the difference video or the output from camera 106, (referring again to FIG. 5), areas that are in infrared shadow can be made to be bright. This inverted image can be projected into the interaction area such that areas that were bright in the infrared image (i.e., the majority of the rest of the interactive surface) can be dark (i.e. receive no projected light), while areas that were dark in the infrared image can receive projected light. Since the guest cannot see the infrared shadow and only sees the projected, inverted "shadow", they will be surprised and amused, since in their everyday experience, shadows are dark, not light. It should be apparent to one skilled in the art that alternative effects may also be added to the "shadow" area, including, but not limited to, physical distortions, colors, stripes, spots, and the like.

Figure 7:
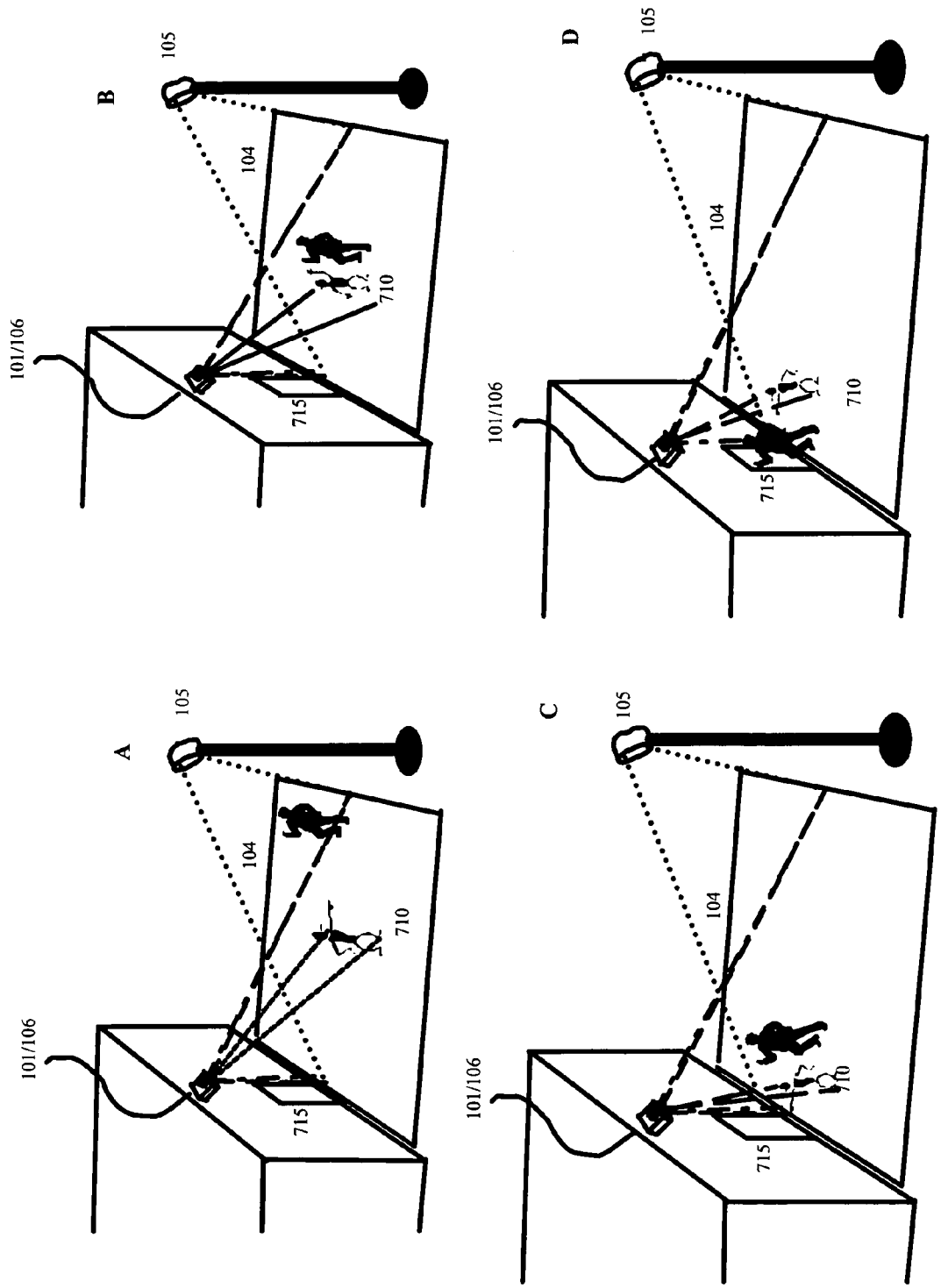
FIG. 7 depicts an animated floor-projected character according to an embodiment of the invention.

In still another embodiment, the optical detection and projection method is similar to that used in the embodiment illustrated in FIGS. 5 and 6, but here, cartoon characters, preferably projected on the interaction surface, interact with guests. By way of example, without intending to limit the present invention, as illustrated in sequences A-D of FIG. 7, a guest walking through interactive area 104 may be approached by a cartoon character that "walks" along with them.

The cartoon character may be made to "talk" by the use of real-time or stored audio clips played out through loudspeakers (not shown). Further, by using a plurality of speakers and conventional 3D audio algorithms, the character's voice can be made to appear as though it is coming from the character's physical location, rather than merely a speaker on the wall.

The software preferably draws the character so that it appears "upright" to the viewer. This can easily be accomplished in view of the geometry of FIG. 7. The software can determine the end of a person's IR shadow that is closest to the IR light source to determine where the guest is positioned. The software can draw the character so that the character's feet are near the participant's feet, with its body extending radially from IR source 105. With this off-axis method of projection and observation of the interaction area, the likelihood that the guest will block projections designated for them is reduced. In this manner, the character approximates the participant's shadow, and indeed, a surprising "show" can be achieved by starting the system in the "white shadow" state described in the previous embodiment, and then morphing the participant's shadow into the character.

The character can provide advertisement, entertainment, or guidance for passersby. Initially, a passerby might tend to ignore the character since interacting with a character drawn on the ground would normally be out of the everyday experience of a passerby. However, the character can move along the floor so as to "block" forward movement of the guest. The character can then beckon the guest to walk in a certain direction while the software monitors their progress. If progress is in the direction to get him or her into, for example, doorway 715, the character can signal it's approval by supportive behaviors (e.g. uttering "That's Right!!", "Come along now!!!", etc.) if not, the character can point, lead, verbally cajole, or in other ways vector the guest. The character can advantageously urge the guest to enter a shop, or help the guest make other directional decisions. By adding one or more directional microphones to the interaction area, the participant and character may also verbally interact.

Figure 8:
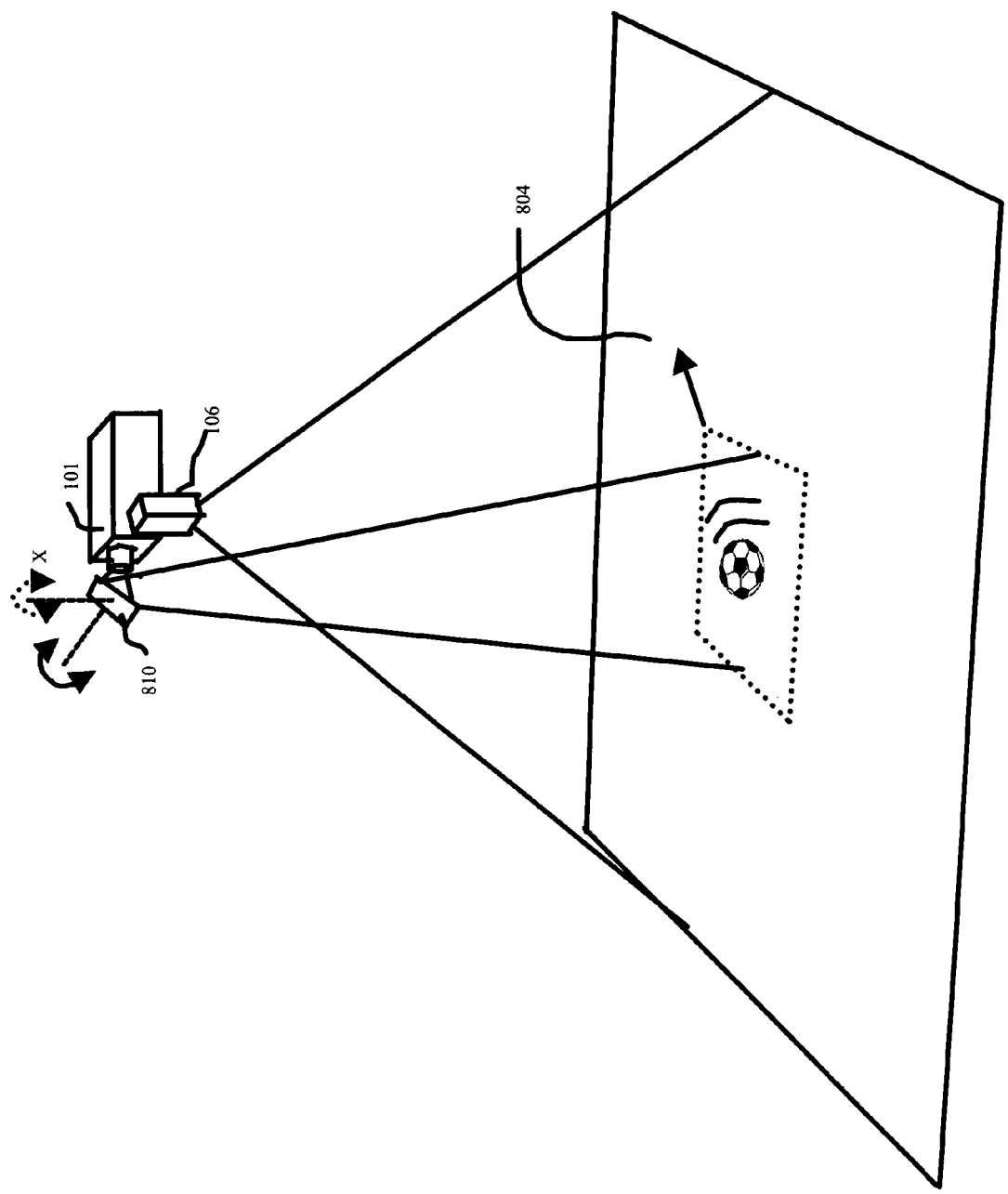
FIG. 8 depicts a slewing projector aspect of an embodiment of the invention.

In still another alternate embodiment, illustrated in FIG. 8, in order to enlarge the area in which characters or other interactive experiences can take place, the projected image may be emitted by a projector whose cone of output light can be optically directed. This allows the same projector to potentially illuminate a much larger area (although not all at one time), and with high resolution in the area being projected.

In FIG. 8, the image detection portion of the system is identical to that of the earlier embodiments, except that the field of view of camera 106 is preferably made wider than the emitted light image of projector 101. Projector 101 preferably employs a computer controlled optical pan and tilt mirror arrangement 810 in the optical path of the projector (or the entire projector may alternatively be panned and tilted) so that the projected image can be moved over the entire field of view 804 of the camera if required. The software to operate this system is similar to that of the previous embodiments except that it may use a combination of moving of the X-Y light cone of the projector and the video movement of objects within the projected cone to accomplish overall movement of objects on surface 804. In this embodiment, instantaneous interaction with a projected object preferably only occurs in the area that is currently within the scope of projection of the slewing projector. Since camera 106 images over a wider area, activities that take place anywhere in the interactive area can ultimately be responded to by the system. For instance, a new guest's entry into the overall scanned interactive area 804 may occasion a projected character to begin to wean its attention from a current guest and move in the direction of this newly arrived guest, or new characters may be introduced.

In an alternative embodiment, an additional camera may also utilize a pan and tilt mirror arrangement to provide higher resolution viewing of the area in which the projector is capable of projecting. In still another embodiment, a single camera may utilize the pan and tilt mirror arrangement and, if the system loses track of the participant, the system may follow a search pattern until a participant is found or until a default position is reached.

In a soccer or other floor-based sports application, this slewing projector technique can give a much wider range to the movement of the puck or ball while projecting the ball's image with higher resolution and brightness than may be possible with the previously described, static projector embodiments.

Additionally, the projector's ability to slew its output may be combined with video movement within the projected area to provide rapid responses to guest's interactions, a large area of interaction, and highly realistic image.

Figure 9:
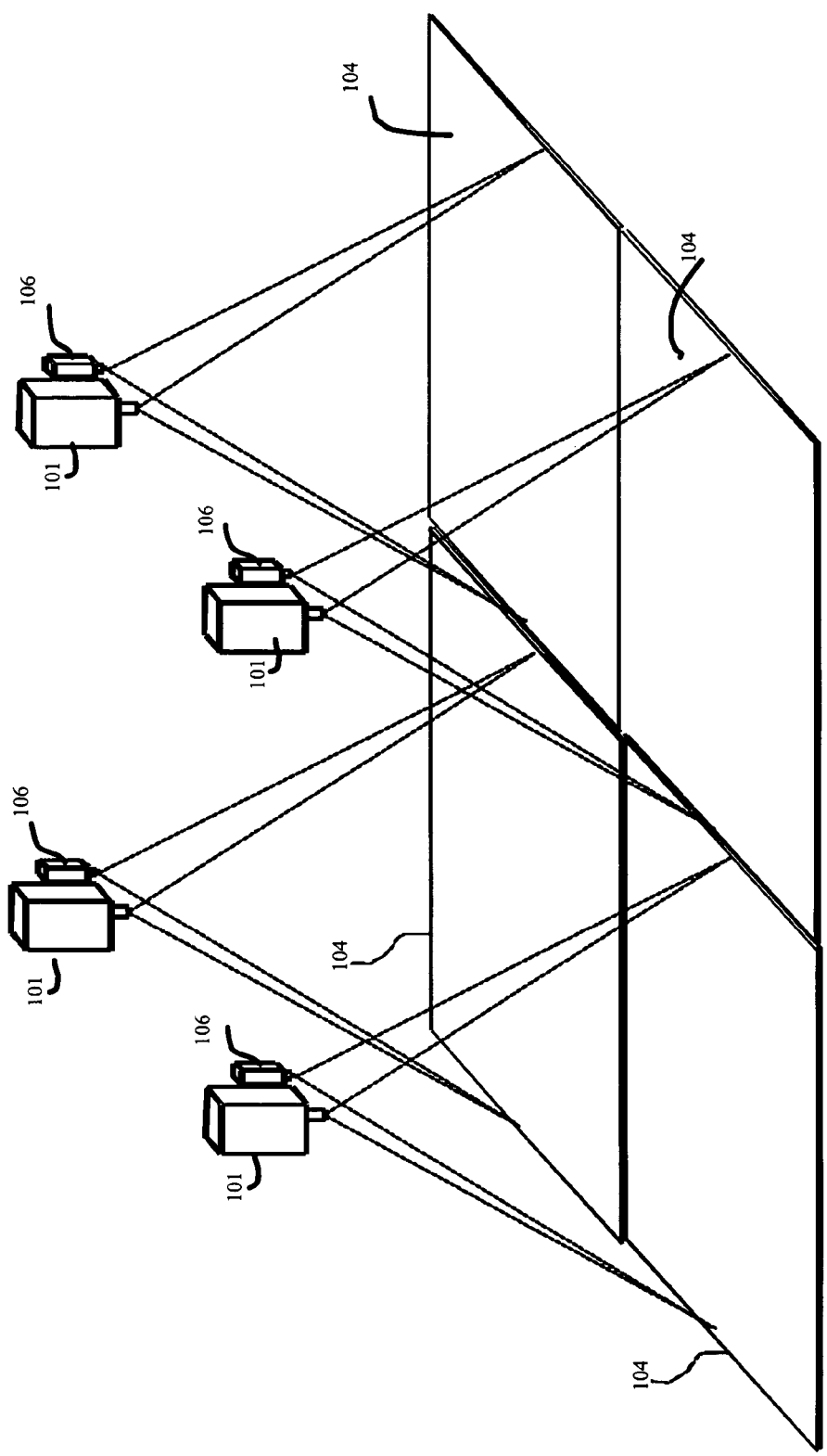
FIG. 9 depicts the use of multiple projectors or cameras to cover a large area with high resolution according to an embodiment of the invention.

An alternate embodiment, depicted in FIG. 9, maybe advantageous in some applications, such as where it is desirable to increase the surface area over which interactivity can take place, or to increase the resolution of detection and projection over a fixed area. Here, multiple "seamed" cameras 106, projectors 101 or camera/projector pairs can be used to image the floor surface and/or to project upon it. Individual computers may process the images from cameras 106 separately, and projected areas or they can be handled by one high-speed computer with multiple analog to digital converters and graphical output capabilities.

Figure 10:
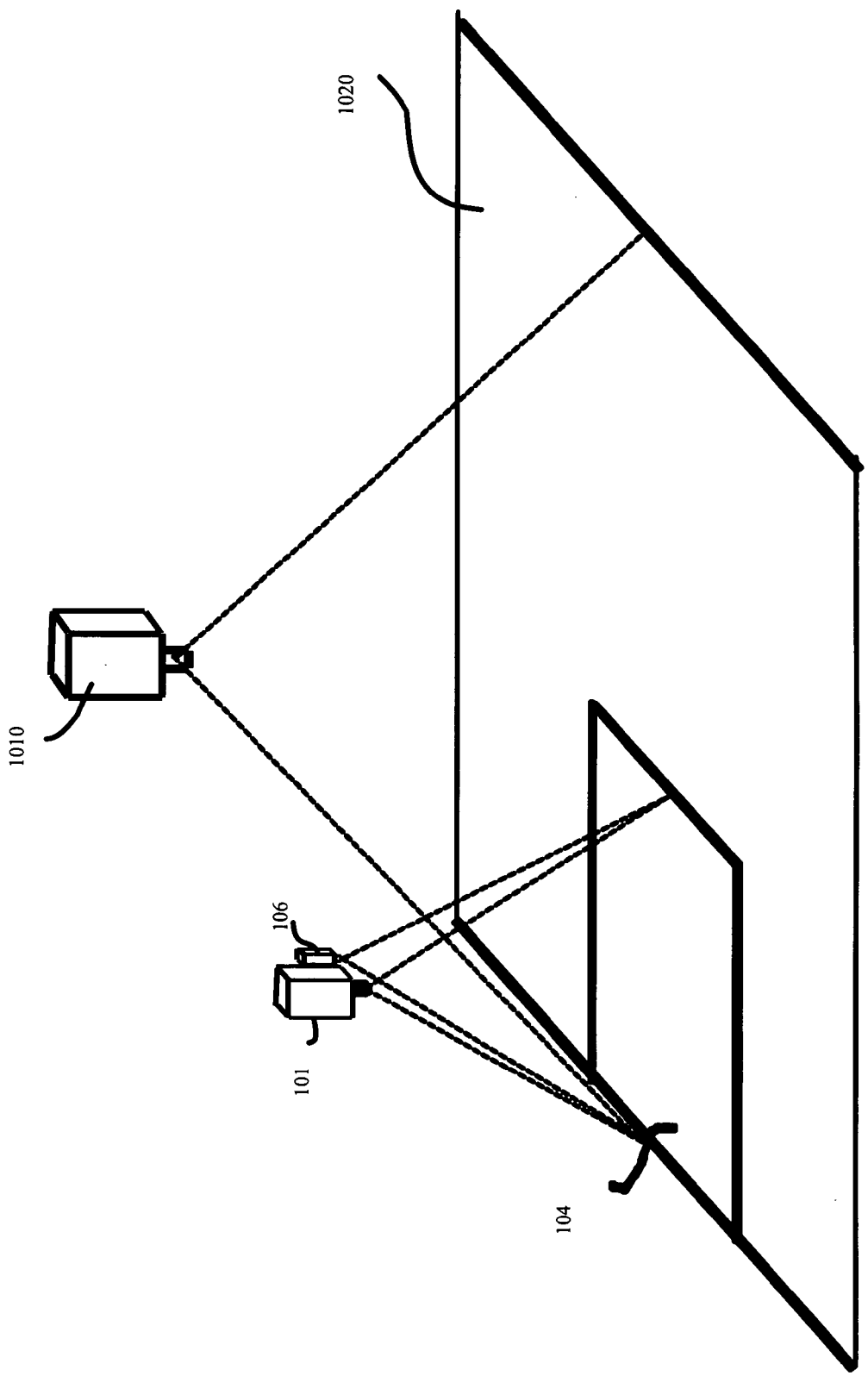
FIG. 10 depicts an interactive area embedded within a larger non-interactive area according to an embodiment of the invention.

In another embodiment, depicted in FIG. 10, to give the perception to the guest that a very large interactive area exists, the actual interactive projection area 104 can be surrounded by a large, fixed, and non-interactive area 1020 projected by a static image projector 1010 such as a slide or gobo type projector. This further lowers the cost of the system and can augment the interactive area's aesthetic appearance. Either the area in the static image can be masked out so that the interactive area fills in this dark space, or the interactive area projection system can simply over-project in the shared projection area 104.

Figure 11:
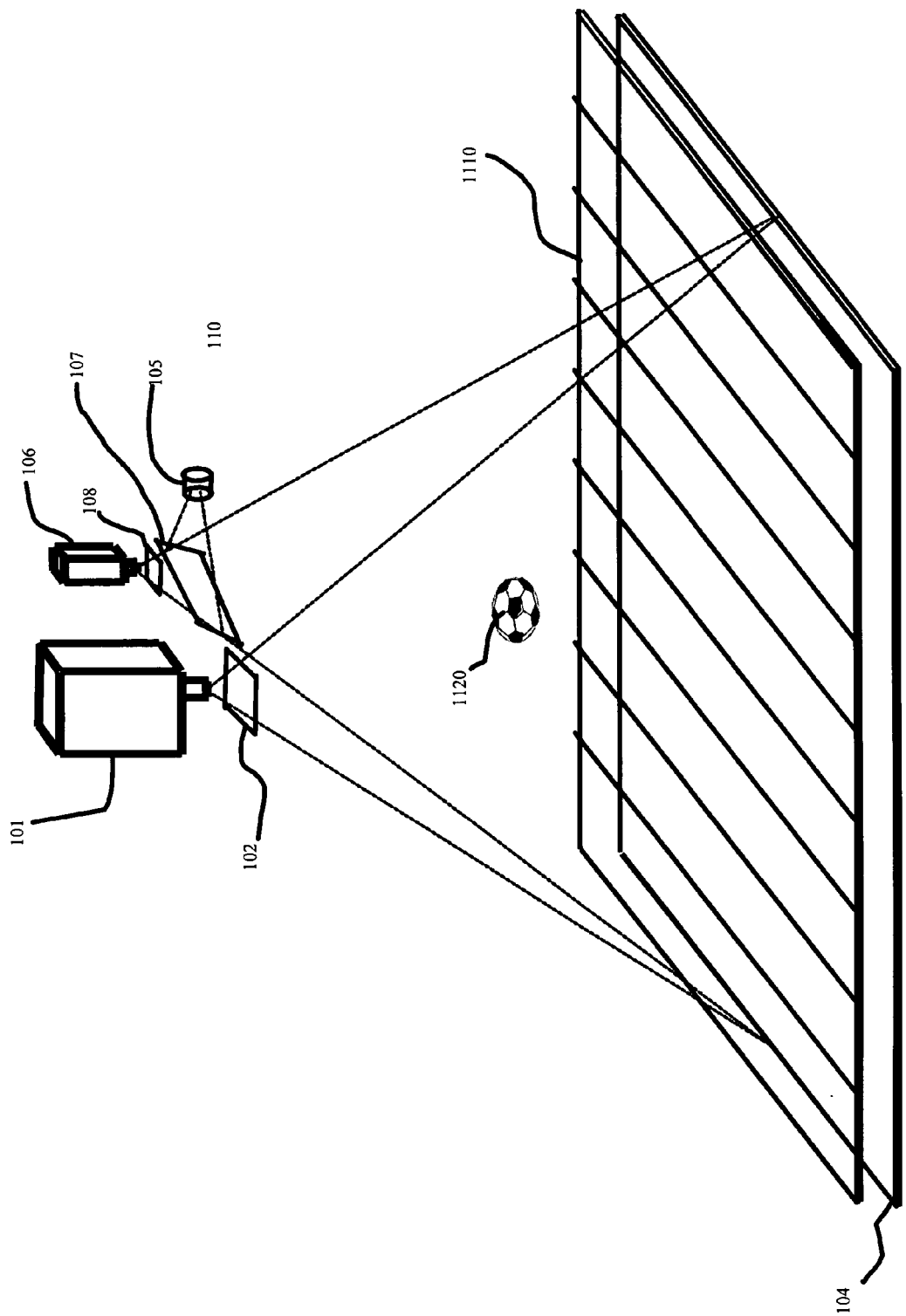
FIG. 11 depicts a three dimensional projection in accordance with an embodiment of the invention.

In yet another alternate embodiment, illustrated in FIG. 11, 3-dimensional display techniques such as, but not limited to, chroma-stereo (marketed by Chromatek Inc., North Fulton Industrial Blvd., Alpharetta, Ga.) may be used to make it appear that the floor projected image has depth and height in various areas. In such an embodiment, an participant may wear prismatic grating glasses (not shown). These bend different colors of light across the optical spectrum by differing amounts. Image portions that are meant to extend from the interactive surface, such as ball 1120, are preferably rendered using colors from one end of the visible spectrum, for instance from the red end. Areas, such as grid 1110 that should look intermediately extended are projected with colors from the middle of the visible spectrum such as green while areas that are meant to appear near, or at, the same level as the interaction surface, such as background area 1104, are projected in colors towards the blue end of the visible spectrum. Chroma-stereo techniques are advantageous over other 3D techniques such as polarized stereo, or field sequential stereo for a floor-based projection application in that the disparity between views which gives the stereo effect is invariant to rotation of a downward facing participant's view. If the participant will only be facing the interactive surface from one orientation, the previously mentioned, as well as other, standard stereo encoding techniques may be used.

Figure 12:
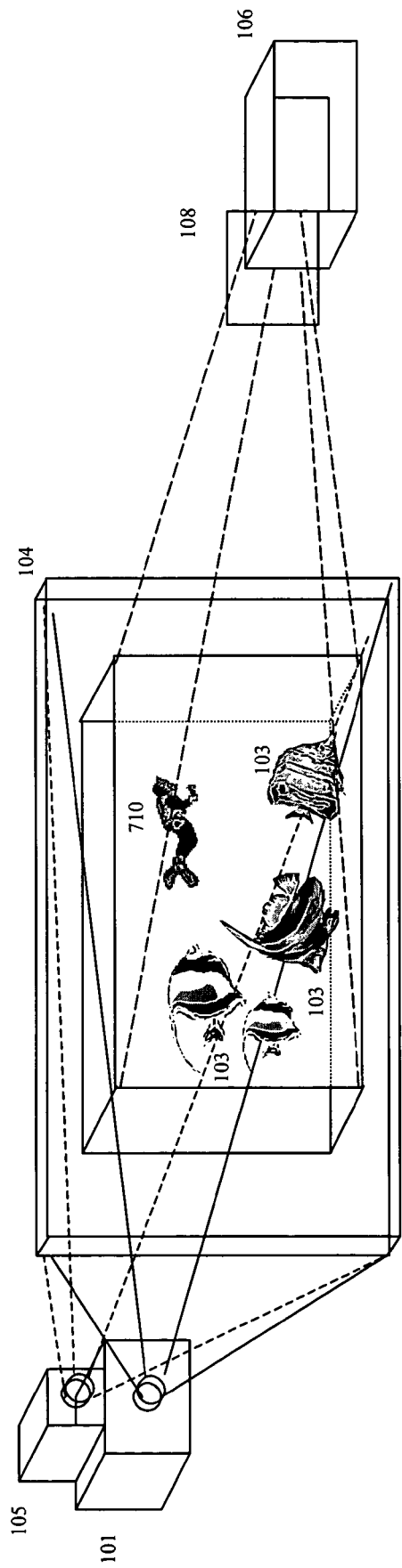
FIG. 12 depicts a fish tank-like embodiment utilizing the present invention.

In addition to being used for large-scale implementations, such as interactive areas which permit human air hockey, the present invention can also be adapted for small-scale use. Furthermore, although visual light projector 101, IR illuminator 105, and camera 106 are typically deployed within a common area, the present invention is not so limited. FIG. 12 illustrates a fish tank-like embodiment utilizing the present invention. In the embodiment illustrated in FIG. 12, live fish serve as participants 103. The fish tank rests against a rear-projection screen which serves as interaction area 104. IR illuminator 105 and visual light projector 101 are preferably located behind the rear projection screen 104. IR illuminator 105 can light interaction area 104 sufficiently that it appears to be "white" to camera 106 when the visible light is attenuated using IR pass filter 108. As fish 103 move around in front of the interaction area 104, they cast shadows, which can be detected by camera 106. Blob processing software 222 can determine the size and location of the shadows. Character 710, in this case an image of a scuba diver which is projected onto interaction area 104 by visual light projector 101, can appear to interact with fish 103, including swimming above, below, or behind the fish.

While the invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they come within the scope of the appended claims and their equivalents.

We claim:

1. A video-actuated system for creating an interactive environment on an interaction surface for a participant, comprising:

at least one energy source capable of generating electromagnetic energy in a relatively limited wavelength range, wherein the at least one energy source is positioned such that the energy from the at least one energy source strikes at least a portion of the interaction surface;

at least one electromagnetic imaging device, wherein the at least one electromagnetic imaging device is capable of detecting electromagnetic energy in at least the relatively limited wavelength range generated by the at least one energy source and converting the detected energy into an output video signal including a plurality of frames, and wherein the at least one electromagnetic imaging device is positioned such that the at least one electromagnetic imaging device can detect the electromagnetic energy from at least a portion of the interaction surface;

at least one visible light projector having at least one input, wherein the at least one projector is capable of projecting visible light onto the interaction surface;

at least one computer; and at least one computer program process operating on the at least one computer, capable of receiving the output video signal from the electromagnetic imaging device, detecting blobs of infrared energy within the output signal by scanning each pixel in each frame of the output signal and setting pixel intensity in each frame to zero for each pixel having an intensity less that a predetermined threshold, reporting information about the blobs, processing the blob information, and generating an input to the at least one visible light projector based on the processed blob information, wherein the blob information includes coordinates of a bounding box for each blob, determined by:

setting each pixel at or above the threshold as a blob pixel and each pixel below the threshold as a zeroed pixel, determining a top and bottom edge of each blob by selecting a first blob pixel, moving up and down a frame one row at a time in a same column as the selected first blob pixel until a zeroed pixel is encountered, and saving coordinates of each last encountered blob pixel in the same column;

calculating and saving coordinates of a vertical mid-point pixel between the coordinates of the last encountered blob pixels in the same column;

setting the vertical mid-point pixel as a next blob pixel;

determining a right and left edge of each blob by moving left and right in the frame one column at a time in the same row as the next blob pixel until a zeroed pixel is encountered, and saving coordinates of the last encountered blob pixels in the same row;

calculating and saving coordinates of a horizontal mid-point pixel between the coordinates of the last encountered blob pixels in the same row;

determining a top and bottom edge of the blob by moving up and down the frame one row at a time in the same column as the horizontal midpoint pixel until a zeroed pixel is encountered, and saving the coordinates of the last encountered blob pixels in that column; and calculating and saving the bounding box coordinates of each blob from an intersection of a vertical line through the horizontal midpoints and a horizontal line through the vertical midpoints as above determined.

2. The system of claim 1, further comprising at least one relatively narrow wavelength pass filter, wherein the at least one pass filter allows electromagnetic energy substantially equivalent to the relatively narrow wavelength range generated by the energy source to pass through effectively unattenuated while attenuating electromagnetic energy at other wavelengths, and wherein the at least one pass filter is positioned substantially between the at least one imaging device and the interaction surface, such that substantially all electromagnetic energy entering the at least one imaging device passes through at least one pass filter.

3. The system of claim 1, further comprising at least one relatively narrow wavelength stop filter, wherein the at least one stop filter attenuates electromagnetic energy substantially equivalent to the relatively narrow wavelength range generated by the electromagnetic energy source while allowing other electromagnetic wavelengths to pass through effectively unattenuated, and wherein the at least one stop filters are positioned substantially between the at least one visible light projector and the surface, such that substantially all light from the at least one visible light projector passes through the at least one stop filter.

4. The system of claim 1, further comprising:

at least one relatively narrow wavelength pass filter, wherein the at least one pass filter allows electromagnetic energy substantially equivalent to the relatively narrow wavelength range generated by the energy source to pass through effectively unattenuated while attenuating electromagnetic energy at other wavelengths, and wherein the at least one pass filter is positioned substantially between the at least one imaging device and the interaction surface, such that substantially all electromagnetic energy entering the at least one imaging device passes through at least one pass filter; and at least one relatively narrow wavelength stop filter, wherein the at least one stop filter attenuates electromagnetic energy substantially equivalent to the relatively narrow wavelength range generated by the electromagnetic energy source while allowing other electromagnetic wavelengths to pass through effectively unattenuated, and wherein the at least one stop filters are positioned substantially between the at least one visible light projector and the interaction surface, such that substantially all light from the at least one visible light projector passes through the at least one stop filter.

5. The system of claim 1, wherein the energy source generates electromagnetic energy with wavelengths in the infrared range.

6. The system of claim 1, wherein the interaction surface is comprised of a floor, and the energy source is positioned substantially above the interaction surface.

7. The system of claim 1, wherein the electromagnetic imaging device is a grayscale CCD camera.

8. The system of claim 1, wherein the interaction surface is comprised of a floor, and the imaging device is positioned substantially above the interaction surface.

9. The system of claim 1, wherein blob detection occurs on a frame-by-frame basis.

10. The system of claim 1, wherein blob detection is based on at least one customizable threshold brightness level.

11. The system of claim 1, wherein blob detection is based on at least one customizable blob size threshold.

12. The system of claim 11, wherein blob detection is based on at least one customizable threshold brightness level.

13. The system of claim 1, wherein blob detection is controllable based on a customizable granularity setting.

14. The system of claim 1, wherein a target is associated with the at least one participant.

15. The system of claim 14, wherein the target is a retro-reflective target.

16. The system of claim 1, wherein a plurality of targets are associated with each of the at least one participants.

17. The system of claim 16, wherein three targets of a known orientation are associated to each of the at least one participants.

18. The system of claim 17, wherein the blob information includes the size and location of each blob.

19. The system of claim 18, wherein the blob information is used to determine the orientation of each of the at least one the participants.

20. The system of claim 19, wherein the orientation of at least one of the at least one participants is used by the at least one computer program process to generate the input to the visual light projector.

21. The system of claim 17, wherein the blob information is used to determine the height of a prop above the interaction surface.

22. The system of claim 17, wherein the blob information is used to determine the scale of at least a portion of the image projected by the visual light projector.

23. The system of claim 1, wherein an electromagnetic energy source is assigned to each of the at least one participants.

24. The system of claim 1, wherein a pan and tilt mirror is placed in the optical path of the visible light projector.

25. The system of claim 1, wherein the visible light projector projects light encoded using a three dimensional display technique.

26. The system of claim 1, wherein the electromagnetic energy source projects electromagnetic energy onto at least a portion of the interaction surface from a position different from that from which the at least one electromagnetic imaging device detects the at least a portion of the interaction surface such that at least one of the at least one participants appears to cast a shadow on the at least a portion of the interaction surface when the at least a portion of the interaction surface is detected by the at least one electromagnetic imaging device.

27. The system of claim 26, wherein the blob detection algorithm determines the position of at least one participant shadow within the at least a portion of the interaction surface detected by the at least one electromagnetic imaging device.

28. The system of claim 27, wherein the at least one computer program process causes the at least one visible light projector to project an animated character in the region of the at least one participant shadow.

29. The system according to claim 1 wherein:
the interaction surface is comprised of a floor;
at least one retro-reflective target is associated with the at least one participant;
the at least one energy source is an infrared energy source, wherein the infrared energy source is positioned substantially above the interaction surface and capable of projecting infrared energy onto the interaction surface;
the at least one electromagnetic imaging device is at least one grayscale CCD camera, wherein the camera is capable of detecting the infrared energy generated by the infrared energy source and converting the detected energy into an output signal, and wherein the at least one camera is positioned substantially above the interaction surface;
the system further comprising at least one relatively narrow wavelength pass filter, wherein the at least one pass filter allows infrared energy from the energy source to pass through effectively unattenuated while attenuating electromagnetic energy at other wavelengths, and wherein the at least one pass filter is positioned substantially between the at least one camera and the interaction surface, such that substantially all electromagnetic energy entering the at least one camera passes through at least one pass filter;
at least one relatively narrow wavelength stop filter, wherein the at least one stop filter attenuates infrared energy of a wavelength substantially equivalent to that generated by the electromagnetic energy source while allowing other electromagnetic wavelengths to pass through effectively unattenuated, and wherein the at least one stop filters are positioned substantially between the at least one visible light projector and the interaction surface, such that substantially all light from the at least one visible light projector passes through the at least one stop filter.

30. The system of claim 29, wherein blob detection occurs on a frame-by-frame basis.

31. The system of claim 29, wherein blob detection is based on at least one customizable threshold brightness level.

32. The system of claim 29, wherein blob detection is based on at least one customizable blob size threshold.

33. The system of claim 32, wherein blob detection is based on at least one customizable threshold brightness level.

34. The system of claim 29, wherein blob detection is controllable based on a customizable granularity setting.

35. The system of claim 29, wherein a target is associated with the at least one participant.

36. The system of claim 35, wherein the target is a retro-reflective target.

37. The system of claim 29, wherein a plurality of targets are associated with each of the at least one participants.

38. The system of claim 37, wherein three targets of a known orientation are associated to each of the at least one participants.

39. The system of claim 38, wherein the blob information includes the size and location of each blob.

40. The system of claim 39, wherein the blob information is used to determine the orientation of each of the at least one the participants.

41. The system of claim 40, wherein the orientation of at least one of the at least one participants is used by the at least one computer program process to generate the input to the visual light projector.

42. The system of claim 29, wherein the visible light projector includes a pan and tilt mirror.

43. The system of claim 29, wherein the visible light projector projects light encoded using a three dimensional display technique.

44. A video-actuated system for creating an interactive environment for at least one participant with respect to an interaction surface, comprising:
at least one imaging device, for generating an output video signal representative of at least a portion of the interaction surface;
a visible light projector having at least one input, wherein the projector is capable of projecting visible light onto only a subset of the interaction surface, wherein the interaction surface and the visible light projector are positioned such that the participant is located substantially between the interaction surface and the visible light projector;
a pan and tilt mirror system placed in the optical path of the projector, wherein the pan and tilt mirror system is capable of directing the output from the visible light projector to a desired position;
at least one computer;
at least one computer program process operating on the at least one computer, capable of receiving the output video signal from the imaging device, detecting the position of the participant within an area on the interaction surface by scanning each pixel in each frame of the video output signal and setting pixel intensity in each frame to zero for each pixel having an intensity less that a predetermined threshold and detecting the at least one participant position by determining a blob position, generating a signal for projecting a character in the proximity of the at least one participant, providing the signal to the input of the visible light projector, and providing approximately the detected position of the participant via the blob position to the pan and tilt mirror system, wherein the blob position includes coordinates of a bounding box for each blob, determined by:
setting each pixel at or above the threshold as a blob pixel and each pixel below the threshold as a zeroed pixel,
determining a top and bottom edge of each blob by selecting a first blob pixel, moving up and down a frame one row at a time in a same column as the selected first blob pixel until a zeroed pixel is encountered, and saving coordinates of each last encountered blob pixel in the same column;
calculating and saving coordinates of a vertical mid-point pixel between the coordinates of the last encountered blob pixels in the same column;
setting the vertical mid-point pixel as a next blob pixel;
determining a right and left edge of each blob by moving left and right in the frame one column at a time in the same row as the next blob pixel until a zeroed pixel is encountered, and saving coordinates of the last encountered blob pixels in the same row;

calculating and saving coordinates of a horizontal midpoint pixel between the coordinates of the last encountered blob pixels in the same row;

determining a top and bottom edge of the blob by moving up and down the frame one row at a time in the same column as the horizontal midpoint pixel until a zeroed pixel is encountered, and saving the coordinates of the last encountered blob pixels in that column; and calculating and saving the bounding box coordinates of each blob from an intersection of a vertical line through the horizontal midpoints and a horizontal line through the vertical midpoints as above determined.

45. The system of claim 44, wherein the pan and tilt mirror system allows the generated character to follow the participant across the interaction surface.

46. A video-actuated system for creating an interactive environment on an interaction surface for a participant, comprising:

at least one energy source capable of generating electromagnetic energy in a relatively limited wavelength range, wherein the at least one energy source is positioned such that the energy from the at least one energy source strikes at least a portion of the interaction surface;

at least one electromagnetic imaging device, wherein the at least one electromagnetic imaging device is capable of detecting electromagnetic energy in at least the relatively limited wavelength range generated by the at least one energy source and converting the detected energy into an output video signal including a plurality of frames, and wherein the at least one electromagnetic imaging device is positioned such that the at least one electromagnetic imaging device can detect the electromagnetic energy from at least a portion of the interaction surface;

at least one visible light projector having at least one input, wherein the at least one projector is capable of projecting visible light onto the interaction surface;

at least one computer; and at least one computer program process operating on the at least one computer, capable of receiving the output video signal from the electromagnetic imaging device, detecting blobs of infrared energy within the output signal by scanning each pixel in each frame of the output signal and setting pixel intensity in each frame to zero for each pixel having an intensity less that a predetermined threshold, reporting information about the blobs, processing the blob information, and generating an input to the at least one visible light projector based on the processed blob information, wherein the blob information includes coordinates of a midpoint for each blob, wherein the midpoint is determined by:

scanning each pixel to determine a top and bottom edge of each blob;

saving the coordinates along the top and bottom edge of each blob;

calculating the vertical midpoint of each blob from the coordinates of the top and bottom edge of each blob;

scanning each pixel to determine a right and left edge of each blob;

saving the coordinates along the right and left edge of each blob;

calculating the horizontal midpoint of each blob from the coordinates of the right and left edge of each blob; and calculating the midpoint of each blob from an intersection of a vertical line through the horizontal midpoint and a horizontal line through the vertical midpoint.

47. A video-actuated system for creating an interactive environment for at least one participant with respect to an interaction surface, comprising:

at least one imaging device, for generating an output video signal representative of at least a portion of the interaction surface;

a visible light projector having at least one input, wherein the projector is capable of projecting visible light onto only a subset of the interaction surface, wherein the interaction surface and the visible light projector are positioned such that the participant is located substantially between the interaction surface and the visible light projector;

a pan and tilt mirror system placed in the optical path of the projector, wherein the pan and tilt mirror system is capable of directing the output from the visible light projector to a desired position;

at least one computer;

at least one computer program process operating on the at least one computer, capable of receiving the output video signal from the imaging device, detecting the position of the participant within an area on the interaction surface by scanning each pixel in each frame of the video output signal and setting pixel intensity in each frame to zero for each pixel having an intensity less that a predetermined threshold and detecting the at least one participant position by determining a blob position, generating a signal for projecting a character in the proximity of the at least one participant, providing the signal to the input of the visible light projector, and providing approximately the detected position of the participant via the blob position to the pan and tilt mirror system, wherein the blob information includes coordinates of a midpoint for each blob, wherein the midpoint is determined by:

scanning each pixel to determine a top and a bottom edge of each blob;

saving the coordinates along the top and the bottom edge of each blob;

calculating the vertical midpoint of each blob from the coordinates of the top and the bottom edge of each blob;

scanning each pixel to determine a right and a left edge of each blob;

saving the coordinates along the right and the left edge of each blob;

calculating the horizontal midpoint of each blob from the coordinates of the right and the left edge of each blob; and calculating the midpoint of each blob from an intersection of a vertical line through the horizontal midpoint and a horizontal line through the vertical midpoint.

* * * * *